United States Patent
Bosch et al.

(10) Patent No.: US 12,506,753 B2
(45) Date of Patent: Dec. 23, 2025

(54) SYSTEMS AND METHODS FOR ANALYZING PARTIAL ATTACK PATHS

(71) Applicant: Cisco Technology, Inc., San Jose, CA (US)

(72) Inventors: Hendrikus G. P. Bosch, Aalsmeer (NL); Jeffrey M. Napper, Delft (NL); Willem Jonker, Groningen (NL); Stefano Simonetto, Enschede (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 196 days.

(21) Appl. No.: 18/350,105

(22) Filed: Jul. 11, 2023

(65) Prior Publication Data

US 2025/0023887 A1 Jan. 16, 2025

(51) Int. Cl.
*H04L 9/40* (2022.01)

(52) U.S. Cl.
CPC ................ *H04L 63/1416* (2013.01)

(58) Field of Classification Search
CPC .......... H04L 63/1416; H04L 63/1433
See application file for complete search history.

(56) References Cited

U.S. PATENT DOCUMENTS

| | | | |
|---|---|---|---|
| 12,255,909 B2* | 3/2025 | Sethi | H04L 63/20 |
| 2007/0113285 A1 | 5/2007 | Flowers et al. | |
| 2013/0031635 A1* | 1/2013 | Lotem | H04L 63/1433 726/25 |
| 2017/0032130 A1 | 2/2017 | Durairaj et al. | |
| 2017/0346839 A1 | 11/2017 | Peppe et al. | |
| 2020/0177618 A1* | 6/2020 | Hassanzadeh | H04L 63/1433 |
| 2021/0367962 A1* | 11/2021 | Kurowski | H04L 63/1433 |
| 2022/0124115 A1 | 4/2022 | Grabois et al. | |
| 2022/0277078 A1 | 9/2022 | Tyagi et al. | |
| 2023/0396641 A1* | 12/2023 | Hebbagodi | H04L 63/1433 |
| 2024/0171614 A1* | 5/2024 | Crabtree | H04L 63/20 |
| 2025/0013754 A1* | 1/2025 | Davidovich | G06F 21/577 |

* cited by examiner

*Primary Examiner* — Richard G Keehn
(74) *Attorney, Agent, or Firm* — Baker Botts L.L.P.

(57) ABSTRACT

In one embodiment, a method includes ingesting security tool findings associated with an application and identifying events associated with the application. The method also includes comparing the security tool findings and the events against known attack paths and determining partial attack path matches between the security tool findings and the events and the known attack paths. The method further includes performing a risk analysis of the partial attack path matches and prioritizing the partial attack path matches based on the risk analysis.

20 Claims, 6 Drawing Sheets

SYSTEMS AND METHODS FOR ANALYZING PARTIAL ATTACK PATHS

TECHNICAL FIELD

The present disclosure relates generally to data security, and more particularly, to systems and methods for analyzing partial attack paths.

BACKGROUND

Security teams can easily become overloaded with security tool findings discovered by tools that are designed to aid the security teams in building and operating their systems. Due to the overwhelming number of security tool findings, approaches may be taken to prioritize these findings. For example, the Common Vulnerability Scoring System (CVSS) has been developed to rate the risk of individual vulnerabilities, while competing approaches have been created in specific industries with different needs such as healthcare with the Risk Scoring System for Medical Devices (RSS-MD). Another approach has been to take the findings as a whole and prioritize groups of findings that can be exploited by an attacker to achieve their nefarious goals. This set of findings is called an attack path, and different vendors have used this approach to help security teams prioritize immediate security threats. While useful, the current attack path analysis has its limitations as well. For example, an attacker may try to use as much as they can from their existing attack path to reach their goal, finding new ways if the old ones no longer work.

DESCRIPTION OF EXAMPLE EMBODIMENTS

Overview

According to an embodiment, a partial attack path analysis tool includes one or more processors and one or more computer-readable non-transitory storage media coupled to the one or more processors and including instructions that, when executed by the one or more processors, cause the partial attack path analysis tool to perform operations. The operations include ingesting security tool findings associated with an application and identifying events associated with the application. The operations also include comparing the security tool findings and the events against known attack paths and determining partial attack path matches between the security tool findings and the events and the known attack paths. The operations further include performing a risk analysis of the partial attack path matches and prioritizing the partial attack path matches based on the risk analysis.

In certain embodiments, the security tool findings are associated with at least one of the following: Common Vulnerabilities and Exposures (CVEs); Common Weakness Enumerations (CWEs); Open Worldwide Application Security Project OWASP vulnerabilities; and/or Center for Information Security (CIS) benchmarks. In some embodiments, the events are associated with at least one of the following: security alerts, application telemetry, and/or cloud telemetry.

In certain embodiments, performing the risk analysis includes determining a length of each of the partial attack path matches and/or prioritizing the partial attack path matches based on the length of each of the partial attack path matches.

In some embodiments, performing the risk analysis includes identifying the partial attack path matches associated with insider threats, determining a length of each of the partial attack path matches associated with the insider threats, and/or prioritizing the partial attack path matches associated with the insider threats based on the length of each of the partial attack path matches associated with the insider threats.

In certain embodiments, performing the risk analysis includes identifying the partial attack path matches associated with one or more customer assets and/or prioritizing the partial attack path matches associated with the one or more customer assets. In some embodiments, the customer assets include one or more of the following: credentials, Application Programming Interface (API) endpoints, databases, data records, central processing unit (CPU) resources, and/or an application.

According to another embodiment, a method includes ingesting security tool findings associated with an application and identifying events associated with the application. The method also includes comparing the security tool findings and the events against known attack paths and determining partial attack path matches between the security tool findings and the events and the known attack paths. The method further includes performing a risk analysis of the partial attack path matches and prioritizing the partial attack path matches based on the risk analysis.

According to yet another embodiment, one or more computer-readable non-transitory storage media embody instructions that, when executed by a processor, cause the processor to perform operations. The operations include ingesting security tool findings associated with an application and identifying events associated with the application. The operations also include comparing the security tool findings and the events against known attack paths and determining partial attack path matches between the security tool findings and the events and the known attack paths. The operations further include performing a risk analysis of the partial attack path matches and prioritizing the partial attack path matches based on the risk analysis.

Technical advantages of this disclosure may include one or more of the following. The current attack path analysis approach takes security tool findings as a whole and prioritize groups of findings that can be exploited by an attacker to achieve their nefarious goals. Certain embodiments of this disclosure addresses the limitations of the current attack path analysis approach by extending the current approach to allow for partial attack path matches. For example, certain embodiments use a probabilistic attack analysis, which extends the current attack path analysis approach by allowing more freedom to mix and match parts of (possibly different) attack paths, resulting in a stronger defense. As another example, certain embodiments of this disclosure use a zero-trust application security analysis, which provides support for insider threats that can begin anywhere in an organization as opposed to external attackers with known initial access points. As still another example, certain embodiments of this disclosure use defense in depth analysis and remediation technique, which allows for defense-in-depth analysis to show high leverage points where an attacker can reach many different paths, and mitigation or remediation would be effective to block them.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods for analyzing partial attack paths. An attack path represents a set of steps that an attacker can take (not necessarily in a specific order) to create an impact. A defender can remediate or mitigate all or part of the attack path to block attackers. However, attackers can be opportunistic and persistent. For example, an attacker may try to use as much as they can from their existing attack path to reach their goal, finding new ways if the old ones no longer work. Attackers may use different vulnerabilities and techniques that do not match the existing attack paths known to the defenders, resulting in defenders only having probabilistic success in defense even if all existing attack paths are completely mitigated or remediated.

This disclosure introduces a set of new techniques to analyze applications for various attack paths. While the current attack path analysis begins by identifying the initial attack vectors, certain embodiments described herein identify attack paths that are similar to the existing and known attack paths as mechanisms by which the attacker may try to evade defense strategies. These similar attack paths may start inside the application to identify, for example, instances where the security team does not know how the attacker gained access to the application but would like to examine what the attacker can do once inside the application. Defense-in-depth strategies may be used to identify high leverage points in the application.

Figure 1:
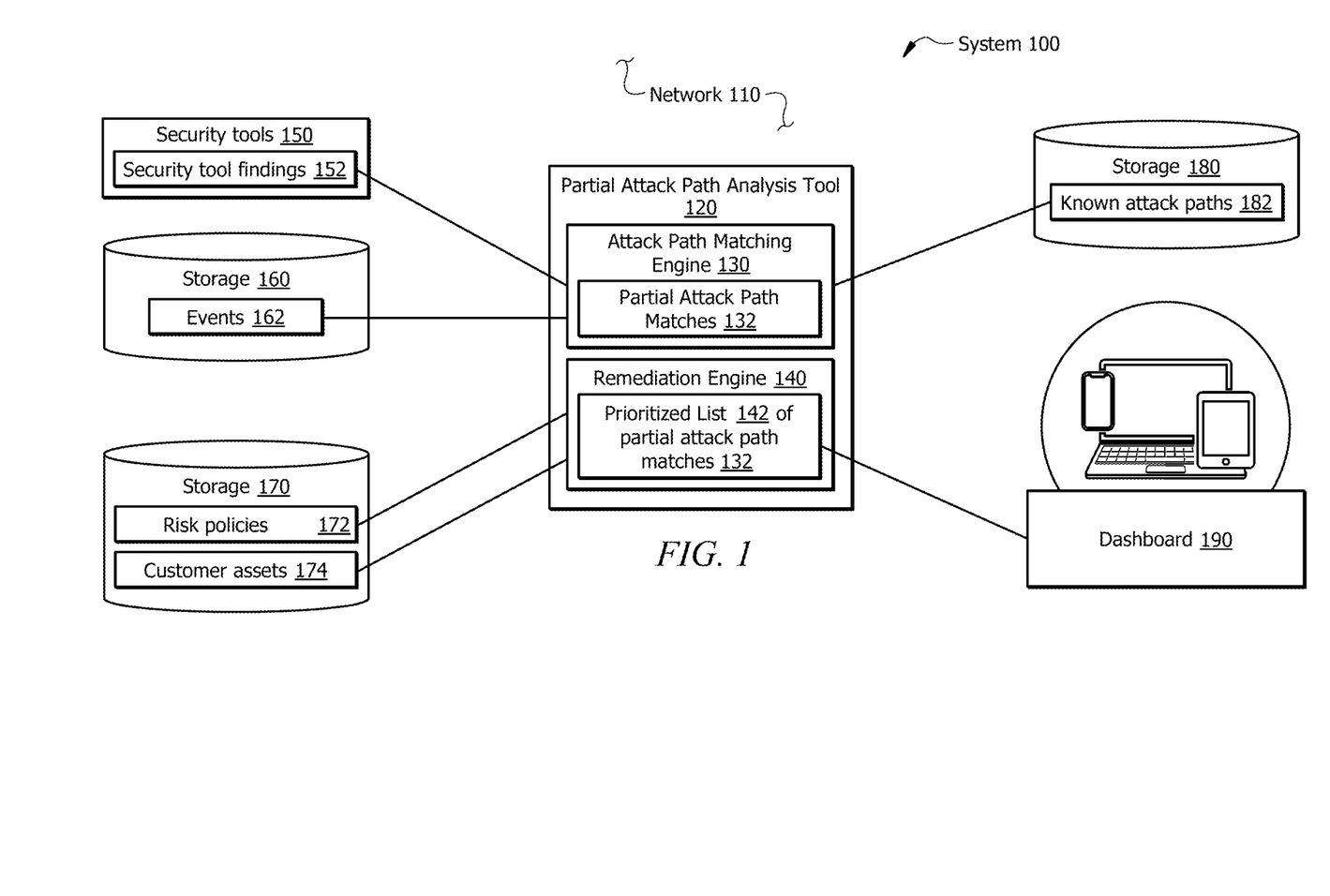
FIG. 1 illustrates a system for analyzing partial attack paths, in accordance with certain embodiments.
Figure 2:
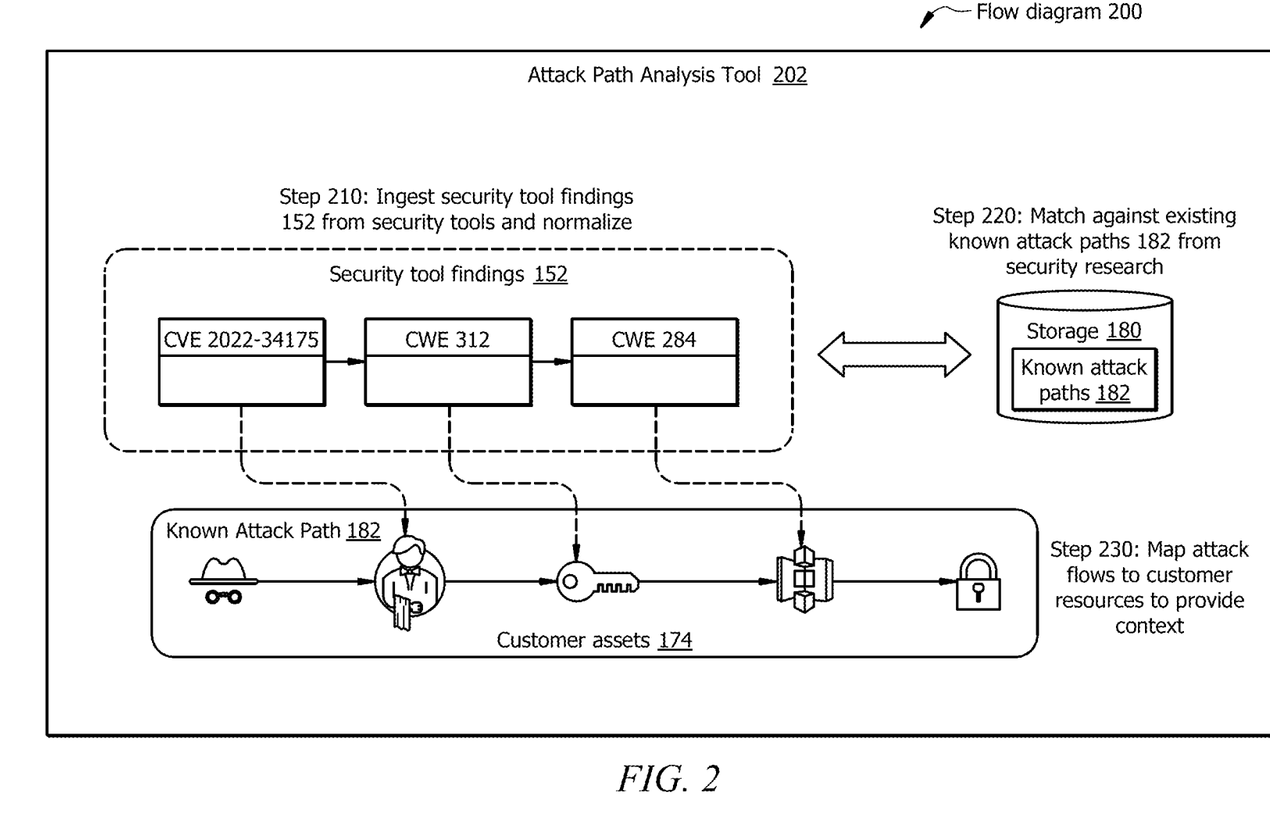
FIG. 2 illustrates a flow diagram for analyzing partial attack paths, in accordance with certain embodiments.
Figure 3:
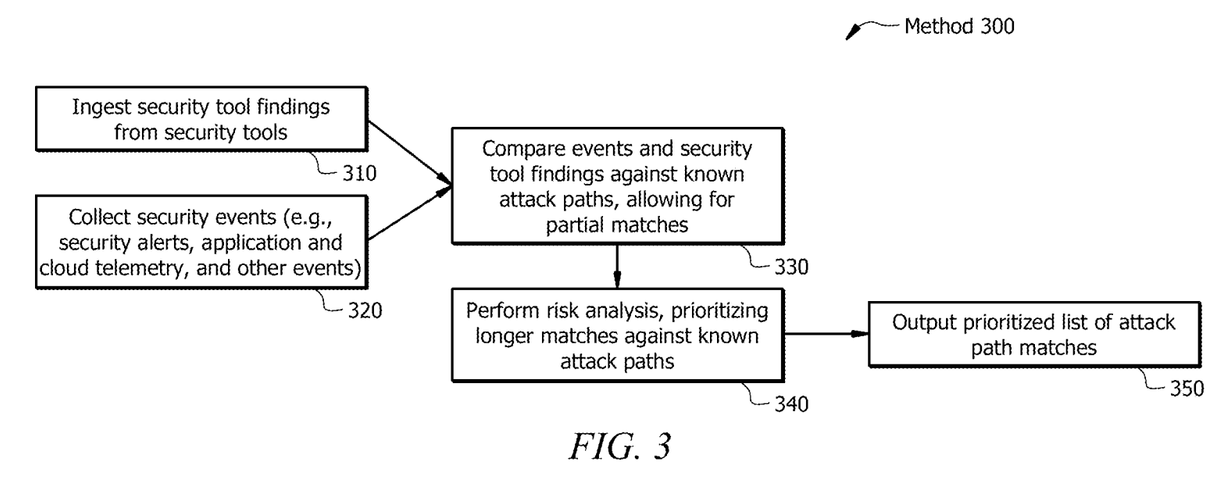
FIG. 3 illustrates a method for analyzing partial attack paths based on a probabilistic attack analysis, in accordance with certain embodiments.
Figure 4:
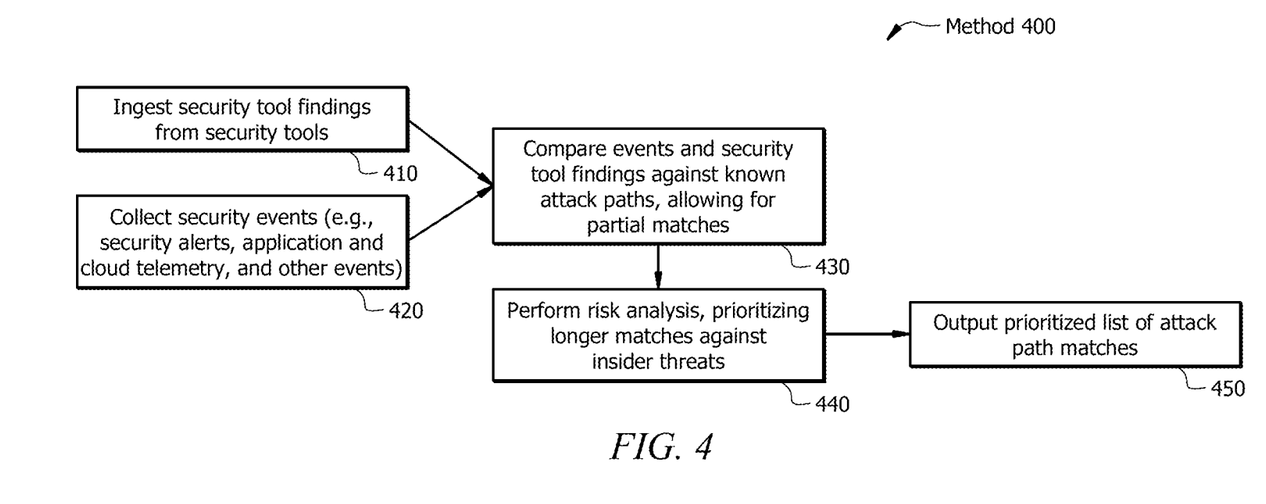
FIG. 4 illustrates a method for analyzing partial attack paths based on zero-trust application security, in accordance with certain embodiments.
Figure 5:
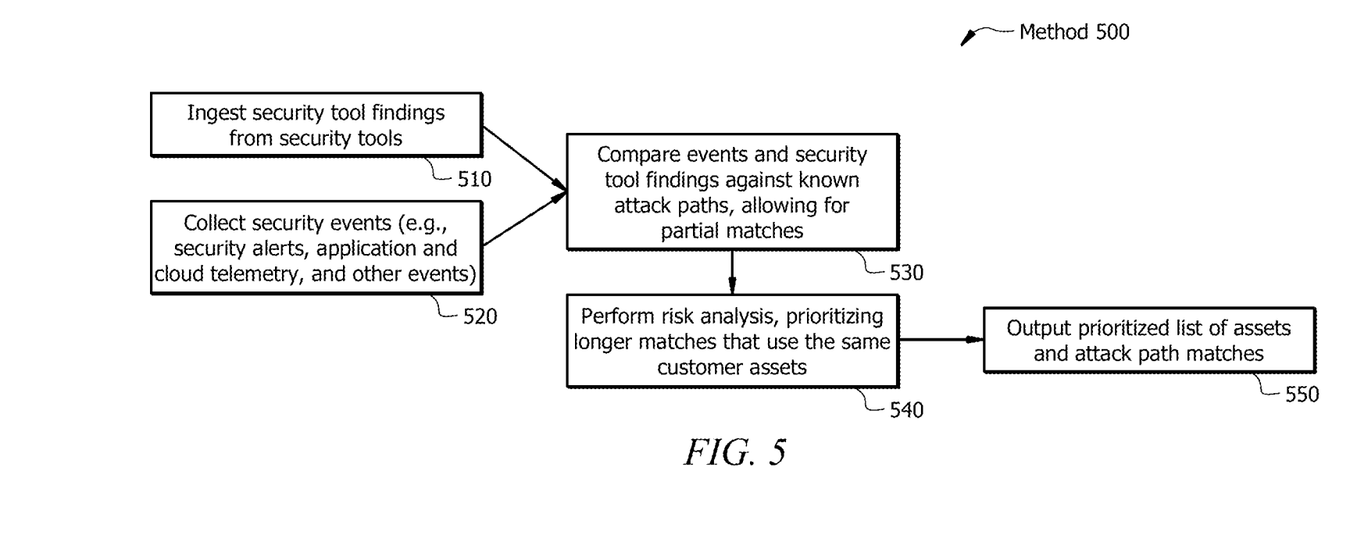
FIG. 5 illustrates a method for analyzing partial attack paths based on a defense-in-depth analysis and remediation, in accordance with certain embodiments.
Figure 6:
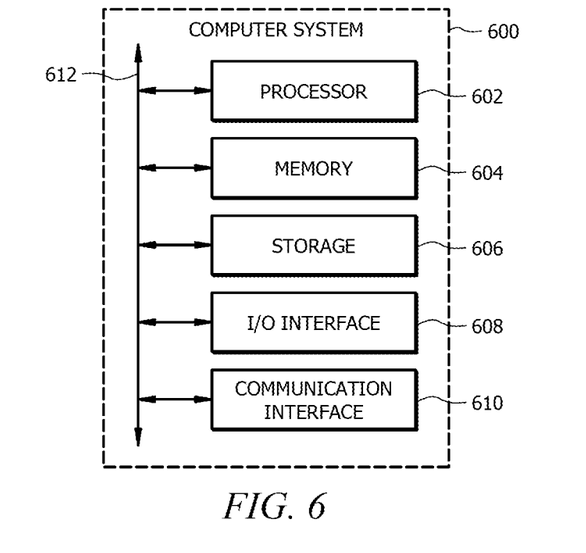
FIG. 6 illustrates a computer system, in accordance with certain embodiments.

FIG. 1 of this disclosure shows an example system for analyzing partial attack paths, and FIG. 2 shows an example flow diagram for analyzing partial attack paths. FIG. 3 shows an example method for analyzing partial attack paths based on a probabilistic attack analysis, FIG. 4 shows an example method for analyzing partial attack paths based on zero-trust application security, and FIG. 5 shows an example method for analyzing partial attack paths based on a defense-in-depth analysis and remediation. FIG. 6 illustrates an example computer system that may be used by one or more of the embodiments described in FIGS. 1 through 5.

FIG. 1 illustrates a system 100 for analyzing partial attack paths, in accordance with certain embodiments. FIG. 1 includes a network 110, a partial attack path analysis tool 120, an attack path matching engine 130, partial attack path matches 132, a remediation engine 140, a prioritized list 142 of partial attack path matches 132, security tools 150, security tool findings 152, storage 160, events 162, storage 170, risk policies 172, customer assets 174, storage 180, known attack paths 182, and a dashboard 190.

Network 110 of system 100 represents any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), a software-defined WAN (SD-WAN), a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a Wi-Fi network, etc. Network 110 may include a core network, an access network of a service provider, an Internet service provider (ISP) network, and the like. One or more components of system 100 may communicate over network 110.

Network 110 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more physical devices, virtual machines, bare metal servers, and the like. As another example, nodes may include data communications equipment such as computers, routers, servers, printers, devices, workstations, switches, bridges, modems, hubs, and the like.

Partial attack path analysis tool 120 of system 100 represents one or more software programs and/or hardware appliances that analyzes security tool findings 152 and/or events 162 using known attack paths 182. In certain embodiments, partial attack path analysis tool 120 receives security tool findings 152 from one or more security tools 150. In some embodiments, partial attack path analysis tool 120 receives events 162 from storage 160. Partial attack path analysis tool 120 may analyze data (e.g., security tool findings 152 and/or events 162) to protect against different types of attacks and/or vulnerabilities. Partial attack path analysis tool 120 may use external feeds along with internal data to analyze the behavior of an application. For example, partial attack path analysis tool 120 may analyze security tool findings 152 and/or events 162 against a curated vulnerability feed. In certain embodiments, partial attack path analysis tool 120 is maintained in the cloud (e.g., a software as a service (SaaS) cloud) by a performance monitoring platform. Partial attack path analysis tool 120 may include one or more controllers that receive metrics from application agents and communicate instructions to the application agents. In certain embodiments, the one or more controllers are updated in real-time.

Attack path matching engine 130 of system 100 represents one or more software programs and/or hardware appliances that compares security tool findings 152 and/or events 162 to known attack paths 182 to determine whether the security tool findings 152 and/or events 162 match one or more portions of the known attack paths 182. In certain embodiments, attack path matching engine 130 compares measured signals from the application as indicators of attacker activity to known attack paths. The more signals measured (such as APIs being used, access privileges being changed or used, data being accessed, etc.) and the closer those signals are to known attack paths 182, the more likely it is that an attack is ongoing. Attack path matching engine 130 may initiate one or more alerts in response to identifying a high-risk attack path (e.g., an attack path in which the entire attack path is exercised in the application).

Attack path matching engine 130 allows for partial attack path matches 132. Partial attack path matches 132 include fractions of attack paths that are exercised in the application, attack paths that have been glued together, and the like. In some embodiments, partial attack path matches 132 represent nearness measures, which are portions of attack paths that are being exercised and are combined with other events that may or may not be parts of other attack paths. For example, if an attacker is using new techniques (a) as part of an initial attack vector into the application, (b) as a method to glue together two existing attack paths, or (c) as a method to get access to the protected assets, the nearness measure is based on the overlap of the interactions with existing attack paths. The more the path overlaps, the higher the measure. Beforehand, it is unclear if a string of events matches attack paths.

If an attack path requires the occurrence of events A, B, C, D, and E, and a strong correlation exists with measured events C, D, and E, then the likelihood is that an attacker is leveraging a portion of the attack path to gain access into the application. In certain embodiments, partial attack path matches 132 suggest that the attacker is using a different attack vector and initial move to gain access into the application. Once inside the application, the attacker can use the same remainder of the attack path to create an impact. The attacker may use various techniques to gain initial access into the application, allowing the attacker to then take actions that are not intended to be allowed while the rest of the attack paths all result in the same sensitive data being exfiltrated. Partial attack path matches 132 assist the security team in identifying these types of situations.

Remediation engine 140 of system 100 represents one or more software programs and/or hardware appliances that performs a risk analysis. For example, remediation engine 140 may assign risk to partial attack path matches 132 using risk policies 172. As another example, remediation engine 140 may prioritize the riskiest partial attack path matches 132 for remediation. In certain embodiments, the risk analysis includes determining relevant policies to guide prioritization. In some embodiments, the risk analysis includes determining relevant coefficients to assess overall risks.

Remediation engine 140 may perform the risk analysis based on a probabilistic attack analysis, a zero-trust application security analysis, and/or a defense-in-depth analysis and remediation. The probabilistic attack analysis may include determining a length of each partial attack path match 132 and prioritizing partial attack path matches 132 based on the length of each partial attack path match 132, prioritizing longer matches. The probabilistic attack analysis is described in more detail in FIG. 3 below.

The zero-trust application security analysis may include identifying partial attack path matches 132 associated with insider threats, determining a length of each partial attack path match 132 associated with the insider threats, and/or prioritizing partial attack path matches 132 associated with the insider threats based on the length of each of partial attack path matches 132 associated with the insider threats, prioritizing longer matches. The zero-trust application security analysis is described in more detail in FIG. 4 below.

Defense-in-depth analysis and remediation may include identifying partial attack path matches 132 associated with one or more customer assets 174 and/or prioritizing partial attack path matches 132 associated with one or more customer assets 174. Defense-in-depth analysis and remediation is described in more detail in FIG. 5 below.

Prioritized list 142 of partial attack path matches 132 of system 100 represents a list or sequence of partial attack path matches 132 arranged in order of their relative importance. Prioritization may be based on the length of partial attack path matches 132, the number of partial attack path matches 132, the length/number of partial attack path matches 132 associated with customer assets 174, the length/number of partial attack path matches 132 associated with insider threats, a combination thereof, etc.

Security tools 150 of system 100 represent one or more software programs and/or hardware appliances that are designed to protect software applications from external threats throughout one or more portions of the application lifecycle. In certain embodiments, security tools 150 use application agents (e.g., Java agents) to monitor the performance of the applications. Application agents may communicate with partial attack path analysis tool 120. For example, application agents may send security tool findings 152 to partial attack path analysis tool 120. In certain embodiments, security tools 150 include security scanning and posture tools to find vulnerabilities. Security tools 150 may be associated with static application security testing (SAST), dynamic application security testing (DAST), interactive application security testing (IAST), runtime application security protection (RASP), and the like.

Security tool findings 152 of system 100 represent data collected from security tools 150. Security tool findings 152 may include vulnerabilities, exposures, security risks, and the like. In the illustrated embodiment of FIG. 2, security tool findings 152 include CVEs, CWEs, OWASP vulnerabilities; CIS benchmarks, and the like. CVEs are publicly disclosed cybersecurity vulnerabilities. Each CVE may be associated with an CVE identification number, a name, and/or a description. CWEs are common software and hardware weaknesses that can be found in architecture, design, code, and/or implementation that can lead to exploitable security vulnerabilities. Each CWE may be associated with a CWE identification number, a name, a description, and/or a number of related vulnerabilities. OWASP vulnerabilities are security weaknesses and/or problems published by the Open Web Application Security Project. CIS benchmarks are prescriptive configuration recommendations for vendor product families.

In certain embodiments, partial attack path analysis tool 120 normalizes security tool findings 152. For example, partial attack path analysis tool 120 may normalize each security tool finding 152 to include a list of valid weaknesses. Weaknesses may include elements such as a Canonical Weakness ID (e.g., CWE-312), an asset ID (e.g., a Canonical ID of the asset in inventory where the weakness was discovered), and the like. Partial attack path analysis tool 120 may normalize security tool findings 152 based on the CVE, CWE, Web Security Threat Classification (WASC), or any other suitable identifier.

Storage 160 of system 100 represents any suitable medium for storing computer data. Storage 160 may include one or more databases. Storage 160 is described in more detail in FIG. 6 (see storage 606 of computer system 600). In the illustrated embodiment of FIG. 1, storage 160 stores events 162.

Events 162 of system 100 represent statistics associated with specific interactions. Events 162 may include security alerts, application telemetry, cloud telemetry, and other events. In certain embodiments, partial attack path analysis tool 120 collects events 162 by observing an application for specific interactions. In certain embodiments, partial attack path analysis tool 120 analyzes events 162 to determine the source of an actual attack against an application. For example, partial attack path analysis tool 120 may observe that a certain API is used to escalate privileges for a particular user. From this observation, partial attack path analysis tool 120 may discover that a container is deployed that starts to interact externally, and thus identify the source of an actual attack against an application.

Storage 170 of system 100 represents any suitable medium for storing computer data. Storage 170 may include one or more databases. Storage 170 is described in more detail in FIG. 6 (see storage 606 of computer system 600). In the illustrated embodiment of FIG. 1, storage 170 stores risk policies 172.

Risk policies 172 of system 100 represent rules used to establish risk within a particular entity. Risk policies 172 may include a trigger based on one or more events and an action in response to the trigger. In certain embodiments, partial attack path analysis tool 120 uses risk policies 172 to automate monitoring, alerting, and/or problem remediation. Risk policies may be associated with an identification, a name, one or more actions, one or more events, a particular entity or group of entities, one or more nodes, one or more tiers, and the like. Risk policies 172 may include customer risk policies and/or risk parameters established by partial attack path analysis tool 120.

Risk policies 172 may be associated with internal strategic risks (e.g., threats to an entity's business model, product or service portfolio, brands, reputation, and/or standing in the marketplace), internal operational risks (e.g., problems that can affect productivity, profit margin, the supply chain, the physical plant, employee relations, and/or morale), internal financial risks (e.g., factors affecting cash flow, equity, stock price, investments, mergers and acquisitions, foreign exchange, interest rates, and other fiscal matters) external risks (e.g., events such as economic downturns, pandemics, natural and manmade catastrophes, acts of war and terrorism, political turmoil, and regulatory concerns), and the like.

Customer assets 174 of system 100 represent the subjects and/or targets of actions. Actions define attacker events and movement (e.g., ATT&CK techniques). Customer assets 174 may include credentials, API endpoints, databases, data records, CPU resources, applications, images (e.g., container images, virtual machine (VM) images, etc.), configurations (e.g., cloud service configurations, application configurations, etc.), and the like. For example, customer assets 174 may include a WordPress account that requires employee credentials to access WordPress. Customer assets 174 may be identified by an asset identifier (e.g., a Universal Unique Identifier (UUID)). Customer assets 174 may be grouped based on their relationships to one another. For example, a customer asset may have an asset identifier (e.g., 3), which is associated with a relationship (e.g., write, read, and admin privileges), which is associated with a type (e.g., credentials).

Storage 180 of system 100 represents any suitable medium for storing computer data. Storage 180 may include one or more databases. Storage 180 is described in more detail in FIG. 6 (see storage 606 of computer system 600). In the illustrated embodiment of FIG. 1, storage 180 stores known attack paths 182.

Known attack paths 182 of system 100 represent collections of weakness, vulnerabilities, assets, and/or resources that an attacker may use to achieve a goal. In certain embodiments, known attack paths 182 are propositional statements over weaknesses and/or assets. Known attack paths 182 may include machine-readable language defined as an extension to the Structured Threat Information Expression (STIX) standard expressed in JavaScript Object Notation (JSON). In certain embodiments, known attack paths 182 use MITRE Common Attack Pattern Enumeration and Classification (CAPEC). CAPEC provides known patterns of attack employed by adversaries to exploit known weaknesses in cyber-enabled capabilities. A CAPEC instance can exploit different weaknesses during its execution. Known attack paths 182 may represent a set of CAPEC instances that are pinned to the particular weaknesses and/or vulnerabilities used by an actor, similar to a MITRE attack flow.

Dashboard 190 of system 100 represents a graphical representation of the analyzed data. In certain embodiments, dashboard 190 is an information management tool that receives data from a linked database to provide data visualizations. In some embodiments, dashboard 190 represents a user interface (e.g., a graphical user interface (GUI)) that visualizes multiple data sources through numbers, graphs, charts, reports, and the like. A user may view dashboard 190 based on the role defined by partial attack path analysis tool 120. Data may be updated (e.g., in real time) on dashboard 190 when partial attack path analysis tool 120 communicates the analyzed data to dashboard 190. In certain embodiments, remediation engine 140 of partial attack path analysis tool 120 communicates prioritized list 142 of partial attack path matches 132 to dashboard 190, which may allow the security team to view prioritized list 142 of partial attack path matches 132 and/or implement appropriate remediation measures.

In operation, security tools 150 scan an application to generate security tool findings 152. Security tool findings may be associated with one or more of the following: CVEs, CWEs, OWASP vulnerabilities, CIS benchmarks, and the like. Partial attack path analysis tool 120 identifies events 162 associated with the application. Events 162 may include one or more of the following: security alerts, application telemetry, and/or cloud telemetry. Partial attack path analysis tool 120 then ingests security tool findings 152 associated with the application and normalizes security tool findings 152. Attack path matching engine 130 of partial attack path analysis tool 120 compares security tool findings 152 and events 162 against known attack paths 182 and determines partial attack path matches 132 between security tool findings 152 and/or events 162 and known attack paths 182.

Remediation engine 140 of partial attack path analysis tool 120 performs a risk analysis of partial attack path matches 132 and prioritizes partial attack path matches 132 based on the risk analysis. The risk analysis may be based on a probabilistic attack analysis (e.g., determining a length of each partial attack path match 132 and/or prioritizing partial attack path matches 132 based on the length of each partial attack path match 132, prioritizing longer matches), a zero-trust application security analysis (e.g., identifying partial attack path matches 132 associated with insider threats, determining a length of each partial attack path match 132 associated with the insider threats, and/or prioritizing partial attack path matches 132 associated with the insider threats based on the length of each partial attack path match 132 associated with the insider threats, prioritizing longer matches), and/or defense-in-depth analysis and remediation (e.g., identifying partial attack path matches 132 associated with one or more customer assets 174 and/or prioritizing partial attack path matches 132 associated with the one or more customer assets 174, prioritizing longer matches). Analyzing partial attack path matches 132 allows more freedom to mix and match parts of (possibly different) attack paths, resulting in a stronger defense.

Although FIG. 1 illustrates a particular number of networks 110, partial attack path analysis tools 120, attack path matching engines 130, partial attack path matches 132, remediation engines 140, prioritized lists 142 of partial attack path matches 132, security tools 150, security tool findings 152, storages (storages 160, storages 170, and storages 180), events 162, risk policies 172, customer assets 174, known attack paths 182, and dashboards 190, this disclosure contemplates any suitable number of networks 110, partial attack path analysis tools 120, attack path matching engines 130, partial attack path matches 132, remediation engines 140, prioritized lists 142 of partial attack path matches 132, security tools 150, security tool findings 152, storages (storages 160, storages 170, and storages 180), events 162, risk policies 172, customer assets 174, known attack paths 182, and dashboards 190.

Although FIG. 1 illustrates a particular arrangement of network 110, partial attack path analysis tool 120, attack path matching engine 130, partial attack path matches 132, remediation engine 140, prioritized list 142 of partial attack path matches 132, security tools 150, security tool findings 152, storage 160, events 162, storage 170, risk policies 172, customer assets 174, storage 180, known attack paths 182, and dashboard 190, this disclosure contemplates any suitable arrangement of network 110, partial attack path analysis tool 120, attack path matching engine 130, partial attack path matches 132, remediation engine 140, prioritized list 142 of partial attack path matches 132, security tools 150, security tool findings 152, storage 160, events 162, storage 170, risk policies 172, customer assets 174, storage 180, known attack paths 182, and dashboard 190.

Although FIG. 1 illustrates describes and illustrates particular components, devices, or systems carrying out particular actions, this disclosure contemplates any suitable combination of any suitable components, devices, or systems carrying out any suitable actions.

FIG. 2 illustrates a flow diagram 200 for analyzing attack paths, in accordance with certain embodiments. When an attacker attacks an application, the attacker may use a recipe to gain access to the application. This recipe is a set of discrete steps to take down the defense of the application, its orchestration system, and/or an underlying cloud system in order to: (a) disrupt the application, (b) steal CPU resources, and/or (c) steal and/or encrypt data sources. A recipe in category (a) may be performed to create mayhem to the target, whereas a recipe in category (b) or category (c) may be for monetary gain of the attacker. The recipe often includes a set of steps to laterally move in an application, to perform reconnaissance, and to drive impact to the application at hand. MITRE ATT&CK is a globally accessible knowledge base of adversary tactics and techniques based on real-world observations. MITRE ATT&CK provides an overview of the tactics and techniques that can be deployed by the attacker.

To defend against attackers, defenders often first discover the vulnerabilities in the application and then remediate and/or mitigate as many of those exploitable vulnerabilities as they can. Unfortunately, the number of vulnerabilities is extensive, and critical vulnerabilities may not be exploitable in the workload. For example, certain vulnerabilities may be part of the application but unreachable to the attacker or part of the application and not even used. Due to the high number of vulnerabilities, security teams can suffer from alert fatigue and fail to remediate and/or mitigate critical vulnerabilities.

Flow diagram 200 of FIG. 2 assists security teams in focusing on key exploits to an application. Flow diagram 200 uses an attack path analysis to combat attackers. In the attack path analysis, an attack path analysis tool 202 is used to chain the vulnerabilities into an attack path in an attempt to discover the attacker's recipe. The attack path may then be presented to the defenders as an example of how attackers may attack an application. Flow diagram 200 of FIG. 2 provides an overview view of the steps of this attack path analysis.

At step 210 of flow diagram 200, attack path analysis tool 202 ingests security tool findings 152 from security tools (e.g., security tools 150 of FIG. 1). Partial attack path analysis tool 120 then normalizes each security tool finding 152. In the illustrated embodiment of FIG. 2, security tool findings 152 include CVE 2022-34175, CWE 312, and CWE 284. CVE 2022-34175 represents an allowance of attackers in some cases to bypass a protection mechanism. For example, the attacker may directly access some view fragments that include sensitive information, bypass permission checks in the corresponding view, etc. CWE-312 represents a weakness associated with cleartext storage of sensitive information. For example, a product may store sensitive information in cleartext within a resource that might be accessible to another control sphere. CWE 284 represents a weakness associated with improper access control. For example, the product may not restrict or incorrectly restricts access to a resource from an unauthorized actor. Weaknesses may include elements such as a Canonical Weakness ID (e.g., CWE-312), an asset ID (e.g., a Canonical ID of the asset in inventory where the weakness was discovered), and the like. Flow diagram 200 then moves from step 210 to step 220.

At step 220 of flow diagram 200, attack path analysis tool 202 matches security tool findings 152 against an existing corpus of known attack paths 182. In certain embodiments, attack path analysis tool 202 searches known attack paths 182 to determine whether necessary vulnerabilities and/or weaknesses are present in security tool findings 152. For example, referring to FIG. 2, attack path analysis tool 202 matches CVE 2022-34175 to a first resource type (an application), matches CWE 312 to an asset type (a key), and matches CWE 284 to a second resource type (a data storage).

At step 230 of flow diagram 200, attack path analysis tool 202 maps attack paths against customer assets 174 to provide context. In certain embodiments, attack path analysis tool 202 may search customer assets 174 (including configurations) to determine whether the necessary resources and assets are present. For example, referring to FIG. 2, attack path analysis tool 202 may identify customer assets 174 that include a Jenkins instance, an API key, and an Amazon S3 bucket, and determine that the first resource type (an application) matches the Jenkins instance, the asset type (a key) matches the API key, and the second resource type (a data storage) matches the Amazon S3 bucket. A perfect attack path analysis allows security teams to focus on the essential exploits used in attacks and stop the attacks by focusing on these key exploits (e.g., disrupting the key exploits).

While the described attack path analysis has several benefits, it presents some challenges. For example, the number of attack paths that exist in applications may be high. Attackers can move around in applications from exploitable vulnerability to exploitable vulnerability and improve their context over time. Since security teams often strive to reduce the number of alerts, this defeats the purpose.

As another example, when attackers are thwarted in their attempts to break into applications, they can slightly deviate their approach to realize the same impact. For instance, to deliver a payload into an application, the attacker may use a Continuous Integration and Continuous Delivery (CICD) pipeline attack, a LOG4J attack, a Lodash attack, etc. The result is that although an attacker may not be able to use a specific initial attack vector to gain access to an application, the rest of the used attack path may still be applicable. Nearness of exploits used by an attacker to a well-known attack path may serve as an indicator to defenders that the attackers discovered another way into the application.

As still another example, attack paths usually start with an initial attack point into the application and then move throughout the application. Since there is little analysis performed on attack paths that start within the application, defenders may not know how an attacker entered the application. Once the attackers are in, they can search the application since the security barrier has been broken. Security inside the application is often more lenient than the security perimeter around the application.

The following analyses may be used to address these challenges: a probabilistic attack analysis, as described in FIG. 3 below; a zero-trust application security analysis, as described in FIG. 4 below; and defense-in-depth analysis and remediation, as described in FIG. 5 below.

Although this disclosure describes and illustrates particular steps of flow diagram 200 of FIG. 2 as occurring in a particular order, this disclosure contemplates any suitable steps of flow diagram 200 of FIG. 2 occurring in any suitable order. Although this disclosure describes and illustrates an example flow diagram for analyzing attack paths, including the particular steps of flow diagram 200 of FIG. 2, this disclosure contemplates any suitable flow diagram for analyzing attack paths, including any suitable steps, which may include all, some, or none of the steps of flow diagram 200 of FIG. 2, where appropriate. Although FIG. 2 describes and illustrates particular components, devices, or systems carrying out particular actions, this disclosure contemplates any suitable combination of any suitable components, devices, or systems carrying out any suitable actions.

FIG. 3 illustrates a method for analyzing partial attack paths based on a probabilistic attack analysis, in accordance with certain embodiments. In the illustrated embodiment of FIG. 3, the steps of method 300 are performed by a partial attack path analysis tool (e.g., partial attack path analysis tool 120 of FIG. 1).

At step 310 of method 300, the partial attack path analysis tool ingests security tool findings from one or more security tools. For example, referring to FIG. 1, partial attack path analysis tool 120 may ingest security tool findings 152 from one or more security tools 150. In certain embodiments, the partial attack path analysis tool normalizes each security tool finding based on the CVE, CWE, WASC, or any other suitable identifier. Method 300 then moves from step 310 to step 320.

At step 320 of method 300, the partial attack path analysis tool collects events form one or more storages. For example, referring to FIG. 1, partial attack path analysis tool 120 may collect events 162 from storage 160. Events 162 may include security alerts, application telemetry, cloud telemetry, security events, APIs being used, access privileges being changed and/or used, data being accessed, event types, timestamps, metrics, log data, traces, etc. Method 300 then moves from step 320 to step 330.

At step 330 of method 300, an attack path matching engine of the partial attack path analysis tool compares the security tool findings and/or the events against known attack paths. For example, referring to FIG. 1, attack path matching engine 130 of partial attack path analysis tool 120 may compare security tool findings 152 and events 162 to known attack paths 182 to determine whether the security tool findings 152 and/or events 162 match one or more portions of known attack paths 182. In certain embodiments, the attack path analysis tool compares measured signals from the application as indicators of attacker activity to known attack paths. The more signals (such as APIs being used, access privileges being changed or used, data being accessed, etc.) that are measured and the closer those signals are to the attack paths, the more likely it is that an attack is ongoing. The attack path matching engine allows for partial matches (e.g., matching measured events C, D, and E to a known attack path requiring events A, B, C, D and E). Method 300 then moves from step 330 to step 340.

At step 340 of method 300, a remediation engine of the partial attack path analysis tool performs a risk analysis, prioritizing longer matches against known attack paths. For example, referring to FIG. 1, remediation engine 140 of partial attack path analysis tool 120 may perform a risk analysis that prioritizes longer partial attack path matches 132 against known attack paths 182. In certain embodiments, the remediation engine determines a number of matches between measured events (e.g., security tool findings 152 and events 162 of FIG. 1) and the events of a known attack path. For example, if measured events C, D, and E match events C, D, and E of a known attack path requiring events A, B, C, D and E, then the remediation engine may determine that the number of matches is 3. As another example, if measured events B, C, D, and E match events B, C, D, and E of the known attack path requiring events A, B, C, D and E, then the remediation engine may determine that the number of matches is 4. The remediation engine would then prioritize 4 partial attack path matches over 3 partial attack path matches. Method 300 then moves from step 340 to step 350.

At step 350 of method 300, the partial attack path analysis tool outputs a prioritized list of attack path matches. For example, referring to FIG. 1, remediation engine 140 of partial attack path analysis tool 120 may communicate prioritized list 142 of partial attack path matches 132 to dashboard 190. A security team may use dashboard 190 to view the risk analysis. By providing security teams with the risk analysis on attack paths from different points within an application, the security team can provide better defense against security vulnerabilities in the application.

Although this disclosure describes and illustrates particular steps of method 300 of FIG. 3 as occurring in a particular order, this disclosure contemplates any suitable steps of method 300 of FIG. 3 occurring in any suitable order. Although this disclosure describes and illustrates an example method for analyzing partial attack paths based on a probabilistic attack analysis, including the particular steps of method 300 of FIG. 3, this disclosure contemplates any suitable method for analyzing partial attack paths based on a probabilistic attack analysis, including any suitable steps, which may include all, some, or none of the steps of method 300 of FIG. 3, where appropriate. Although FIG. 3 describes and illustrates particular components, devices, or systems carrying out particular actions, this disclosure contemplates any suitable combination of any suitable components, devices, or systems carrying out any suitable actions.

FIG. 4 illustrates a method 400 for analyzing partial attack paths based on zero-trust application security, in accordance with certain embodiments. Zero-trust application security assumes that every application, distributed application, and/or operation has exploitable security flaws. Although the defender may not know the specific vulnerability that is present (or the vulnerability would be fixed by the defender), zero-trust application security assumes there are vulnerabilities that the attacker knows, and the defender does not. Zero-trust application security also holds for insider threats. In an insider threat, the attacker exists within the organization. The attacker may actually exist within the organization (e.g., by being paid by an adversary to attack the organization), and/or the attacker may impersonate one or more persons within the organization (e.g., by stolen credentials). Zero-trust application security considers matching attack paths that start from anywhere within the (distributed) application, assuming an attacker has managed to get so far.

Steps 410, 420, and 430 of FIG. 4 correspond to steps 310, 320, and 330 of FIG. 3, respectively. At step 440 of method 400, the remediation engine of the partial attack path analysis tool performs a risk analysis, prioritizing longer matches against insider threats. For example, referring to FIG. 1, remediation engine 140 of partial attack path analysis tool 120 may perform a risk analysis that prioritizes longer attack path matches (including partial attack path matches 132) against insider threats. One or more risk policies (e.g., risk policies 172 of FIG. 1) may be considered to prioritize different aspects of partial attack path matches. These risk policies may consider the location where the attack path begins and/or ends in the application, the impact of the attack path, etc.

In certain embodiments, the remediation engine determines a number of matches between measured events (e.g., security tool findings 152 and events 162 of FIG. 1) and the events of a known attack path but places less importance on measured events that occur outside of the application. For example, assume a known attack path requires events A, B, C, D, and E. Events A and E occur outside of the application, and events B, C, and D occur within the application. In this scenario, measured events B, C, and D (all 3 events occurring within the application) would be prioritized over measured events A, B, and C (only 2 events occurring within the application). Method 400 then moves from step 440 to step 450.

At step 450 of method 400, the partial attack path analysis tool outputs a prioritized list of attack path matches, prioritizing longer matches. For example, referring to FIG. 1, remediation engine 140 of partial attack path analysis tool 120 may communicate prioritized list 142 of partial attack path matches 132 based on insider threats to dashboard 190. A security team may use the dashboard to view the risk analysis. By providing security teams with risk analysis on attack paths from different points within an application, the security team can provide better defense against security vulnerabilities and insider threats.

Although this disclosure describes and illustrates particular steps of method 400 of FIG. 4 as occurring in a particular order, this disclosure contemplates any suitable steps of method 400 of FIG. 4 occurring in any suitable order. Although this disclosure describes and illustrates an example method for analyzing partial attack paths based on zero-trust application security, including the particular steps of method 400 of FIG. 4, this disclosure contemplates any suitable method for analyzing partial attack paths based on zero-trust application security, including any suitable steps, which may include all, some, or none of the steps of method 400 of FIG. 4, where appropriate. Although FIG. 4 describes and illustrates particular components, devices, or systems carrying out particular actions, this disclosure contemplates any suitable combination of any suitable components, devices, or systems carrying out any suitable actions.

FIG. 5 illustrates a method for analyzing partial attack paths based on a defense-in-depth analysis and remediation, in accordance with certain embodiments. Defense-in-depth analysis and remediation uses the matching of partial attack paths to find points in an application with high leverage for the attacker. By analyzing the set of matching partial attack paths, the partial attack path analysis tool can find customer assets where several different or high-impact paths (e.g., paths that the organization considers to be extremely detrimental) come together or start.

For example, unfettered access to a CICD pipeline can provide an attacker the ability to insert their own programs to run in the application by replacing the organization's code with the attacker's code. This can allow the attacker to move laterally through different networks, escalate privileges, and achieve many other goals. Unfettered access to a CICD pipeline is a high-leverage point where several different attack paths can begin within the application. By analyzing the set of matching partial attack paths, the remediation engine can find customer assets where many different or high-impact paths come together or start.

Steps 510, 520, and 530 of FIG. 5 correspond to steps 310, 320, and 330 of FIG. 3, respectively. At step 540 of method 500, the remediation engine of the partial attack path analysis tool performs a risk analysis and prioritizes longer matches that use the same customer assets. For example, referring to FIG. 1, remediation engine 140 of partial attack path analysis tool 120 may perform a risk analysis and prioritize longer attack path matches (including partial attack path matches 132) that use the same customer assets 174. One or more risk policies (e.g., risk policies 172 of FIG. 1) may be considered to prioritize different aspects of partial attack path matches. These risk policies may be associated with a location where the attack path begins and/or ends in the application, the impact of the attack path, etc.

The customer assets found by the risk analysis can provide defenders with an efficient method to block attackers even if the attackers have circumvented other mitigations and/or exploited unknown (to defenders) vulnerabilities. By mitigating and/or remediating any vulnerabilities and/or security risks with these customer assets, the defender can prevent the attacker's progress along many attack paths. Defense-in-depth analysis limits the attacker's freedom at every step of the attack as much as possible.

At step 550 of method 500, the partial attack path analysis tool outputs a prioritized list of assets and attack path matches. For example, referring to FIG. 1, remediation engine 140 of partial attack path analysis tool 120 may communicate prioritized list 142 of partial attack path matches 132 based on customer assets 174 to dashboard 190. The remediation engine may also communicate a prioritized list of customer assets to the dashboard. A security team may use the dashboard to view the prioritized lists of effective points and implement the appropriate defenses. By providing security teams with risk analysis on attack paths from different points within an application, the security team can provide better defense against security vulnerabilities related to customer assets.

Although this disclosure describes and illustrates particular steps of method 500 of FIG. 5 as occurring in a particular order, this disclosure contemplates any suitable steps of method 500 of FIG. 5 occurring in any suitable order. Although this disclosure describes and illustrates an example method for analyzing partial attack paths based on a defense-in-depth analysis and remediation, including the particular steps of method 500 of FIG. 5, this disclosure contemplates any suitable method for analyzing partial attack paths based on a defense-in-depth analysis and remediation, including any suitable steps, which may include all, some, or none of the steps of method 500 of FIG. 5, where appropriate. Although FIG. 5 describes and illustrates particular components, devices, or systems carrying out particular actions, this disclosure contemplates any suitable combination of any suitable components, devices, or systems carrying out any suitable actions.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate. In one or more embodiments, the metadata analysis module 214 (referring to FIG. 2) may utilize or function as one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example, and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, a memory 604, a storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer system 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments disclosed herein include a method, an apparatus, a storage medium, a system and a computer program product, wherein any feature mentioned in one category, e.g., a method, can be applied in another category, e.g., a system, as well.

What is claimed is:

1. A partial attack path analysis tool, comprising:
   one or more processors; and
   one or more computer-readable non-transitory storage media comprising instructions that, when executed by the one or more processors, cause one or more components of the partial attack path analysis tool to perform operations comprising:
   ingesting security tool findings associated with an application;
   identifying events associated with the application;
   comparing the security tool findings and the events against known attack paths;
   determining partial attack path matches between the security tool findings and the events and the known attack paths;
   performing a risk analysis of the partial attack path matches; and
   prioritizing the partial attack path matches based on the risk analysis.

2. The partial attack path analysis tool of claim 1, wherein the security tool findings are associated with at least one of the following:
   Common Vulnerabilities and Exposures (CVEs);
   Common Weakness Enumerations (CWEs);
   Open Worldwide Application Security Project (OWASP) vulnerabilities; and
   Center for Information Security (CIS) benchmarks.

3. The partial attack path analysis tool of claim 1, wherein the events are associated with at least one of the following:
   security alerts;
   application telemetry; or
   cloud telemetry.

4. The partial attack path analysis tool of claim 1, wherein performing the risk analysis further comprises:
   determining a length of each of the partial attack path matches; and
   prioritizing the partial attack path matches based on the length of each of the partial attack path matches.

5. The partial attack path analysis tool of claim 1, wherein performing the risk analysis further comprises:
   identifying the partial attack path matches associated with insider threats;
   determining a length of each of the partial attack path matches associated with the insider threats; and
   prioritizing the partial attack path matches associated with the insider threats based on the length of each of the partial attack path matches associated with the insider threats.

6. The partial attack path analysis tool of claim 1, wherein performing the risk analysis further comprises:
   identifying the partial attack path matches associated with one or more customer assets; and
   prioritizing the partial attack path matches associated with the one or more customer assets.

7. The partial attack path analysis tool of claim 6, wherein the customer assets comprise one or more of the following:
   credentials;
   Application Programming Interface (API) endpoints;
   databases;
   data records;
   central processing unit (CPU) resources; and
   an application.

8. A method, comprising:
   ingesting security tool findings associated with an application;
   identifying events associated with the application;
   comparing the security tool findings and the events against known attack paths;
   determining partial attack path matches between the security tool findings and the events and the known attack paths;
   performing a risk analysis of the partial attack path matches; and
   prioritizing the partial attack path matches based on the risk analysis.

9. The method of claim 8, wherein the security tool findings are associated with at least one of the following:
   Common Vulnerabilities and Exposures (CVEs);
   Common Weakness Enumerations (CWEs);
   Open Worldwide Application Security Project OWASP vulnerabilities; or
   Center for Information Security (CIS) benchmarks.

10. The method of claim 8, wherein the events are associated with at least one of the following:
    security alerts;
    application telemetry; or
    cloud telemetry.

11. The method of claim 8, wherein performing the risk analysis further comprises:
    determining a length of each of the partial attack path matches; and
    prioritizing the partial attack path matches based on the length of each of the partial attack path matches.

12. The method of claim 8, wherein performing the risk analysis further comprises:
    identifying the partial attack path matches associated with insider threats;
    determining a length of each of the partial attack path matches associated with the insider threats; and
    prioritizing the partial attack path matches associated with the insider threats based on the length of each of the partial attack path matches associated with the insider threats.

13. The method of claim 8, wherein performing the risk analysis further comprises:
  identifying the partial attack path matches associated with one or more customer assets; and
  prioritizing the partial attack path matches associated with the one or more customer assets.

14. The method of claim 13, wherein the customer assets comprise one or more of the following:
  credentials;
  Application Programming Interface (API) endpoints;
  databases;
  data records;
  central processing unit (CPU) resources; and
  an application.

15. One or more computer-readable non-transitory storage media embodying instructions that, when executed by a processor, cause the processor to perform operations comprising:
  ingesting security tool findings associated with an application;
  identifying events associated with the application;
  comparing the security tool findings and the events against known attack paths;
  determining partial attack path matches between the security tool findings and the events and the known attack paths;
  performing a risk analysis of the partial attack path matches; and
  prioritizing the partial attack path matches based on the risk analysis.

16. The one or more computer-readable non-transitory storage media of claim 15, wherein the security tool findings are associated with at least one of the following:
  Common Vulnerabilities and Exposures (CVEs);
  Common Weakness Enumerations (CWEs);
  Open Worldwide Application Security Project OWASP vulnerabilities; or
  Center for Information Security (CIS) benchmarks.

17. The one or more computer-readable non-transitory storage media of claim 15, wherein the events are associated with one or more of the following:
  security alerts;
  application telemetry; and
  cloud telemetry.

18. The one or more computer-readable non-transitory storage media of claim 15, wherein performing the risk analysis further comprises:
  determining a length of each of the partial attack path matches; and
  prioritizing the partial attack path matches based on the length of each of the partial attack path matches.

19. The one or more computer-readable non-transitory storage media of claim 15, wherein performing the risk analysis further comprises:
  identifying the partial attack path matches associated with insider threats;
  determining a length of each of the partial attack path matches associated with the insider threats; and
  prioritizing the partial attack path matches associated with the insider threats based on the length of each of the partial attack path matches associated with the insider threats.

20. The one or more computer-readable non-transitory storage media of claim 15, wherein performing the risk analysis further comprises:
  identifying the partial attack path matches associated with one or more customer assets; and
  prioritizing the partial attack path matches associated with the one or more customer assets.

* * * * *